United States Patent [19]

Boileau et al.

[11] 4,230,169
[45] Oct. 28, 1980

[54] NONREINFORCED TIRE HAVING STRENGTHENED ZONES

[75] Inventors: Jacques Boileau, Clermont-Ferrand; Albert Mathevet, Chamalieres, both of France

[73] Assignee: Compagnie Generale des Etablissements Michelin, Clermont-Ferrand, France

[21] Appl. No.: 17,546

[22] Filed: Mar. 5, 1979

Related U.S. Application Data

[63] Continuation of Ser. No. 796,176, May 12, 1977, abandoned, which is a continuation-in-part of Ser. No. 693,969, Jun. 7, 1976, abandoned.

[30] Foreign Application Priority Data

Jun. 12, 1975 [FR] France .............. 75 18483

[51] Int. Cl.³ .................. B60C 9/00; B60C 13/00
[52] U.S. Cl. ................... 152/353 R; 152/357 A
[58] Field of Search ............... 152/353 R, 354, 355, 152/357 A, 352

[56] References Cited

U.S. PATENT DOCUMENTS

| | | | |
|---|---|---|---|
| 1,374,957 | 4/1921 | Seaton | 152/354 X |
| 1,381,173 | 6/1921 | Dwork | 152/355 X |
| 1,836,091 | 12/1931 | Shoemaker | 152/352 |
| 2,902,072 | 9/1959 | Reuter | 152/354 X |
| 3,208,500 | 9/1965 | Knipp et al. | 152/357 A X |
| 3,458,373 | 7/1969 | Knipp et al. | 152/354 X |

*Primary Examiner*—F. J. Bartuska
*Attorney, Agent, or Firm*—Brumbaugh, Graves, Donohue & Raymond

[57] ABSTRACT

A tire of elastic material having a tread extended on both sides by a shoulder followed by a sidewall terminating in a bead, the tire being without reinforcement in the tread and in the sidewalls, is improved due to the fact that between each shoulder and the corresponding sidewall the tire has a zone whose rigidity in the circumferential direction is higher than the rigidity of the adjacent shoulder and adjacent sidewall.

5 Claims, 5 Drawing Figures

FIG. 1
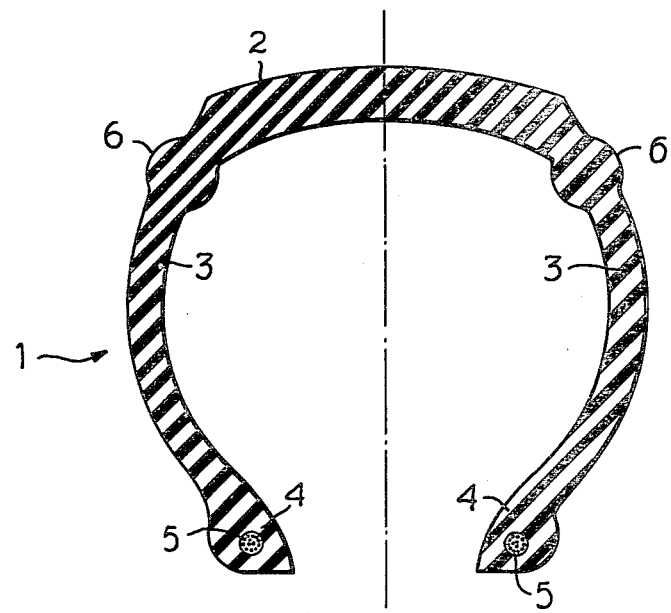
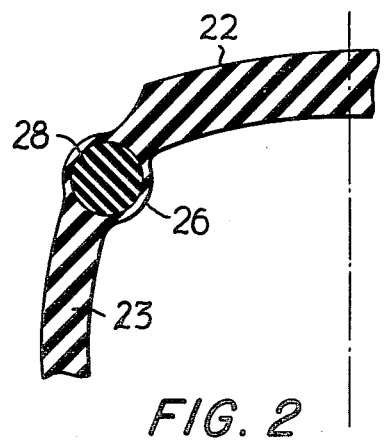
FIG. 2
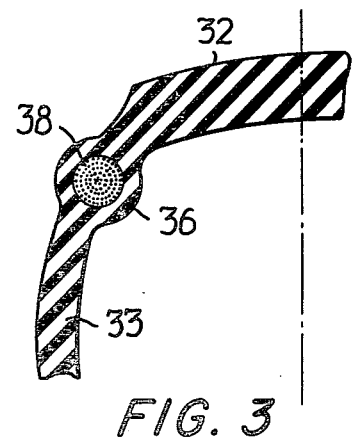
FIG. 3
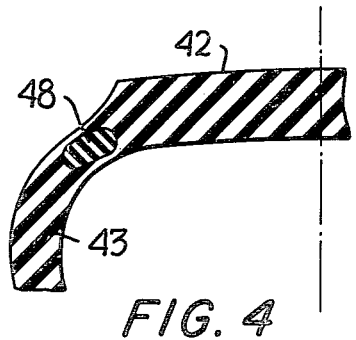
FIG. 4
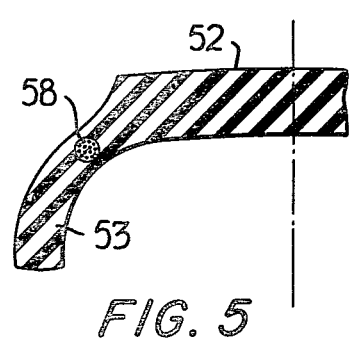
FIG. 5

NONREINFORCED TIRE HAVING STRENGTHENED ZONES

This application is a continuation application of U.S. application Ser. No. 796,176, filed May 12, 1977, now abandoned, which in turn is a continuation-in-part application of U.S. application Ser. No. 693,969, filed June 7, 1976, now abandoned.

The present invention relates to improvements in tires and more particularly to tires which are entirely or partially without reinforcement.

In tires of this type, it is important that the elastomeric mass forming such tires be distributed judiciously and economically. For this purpose, it has been proposed to impart at least one reversal of curvature of the median line in the sidewall of the tire, as seen in radial section. In this way, a beneficial deconcentration of the stresses is obtained. Nevertheless the shear stresses of the elastic mass are considered to be the most harmful.

The present invention is based on the fact that the shearing comes from the inequality of the principal deformations which, in the present case, are the radial deformation ($\epsilon_r$) and the circumferential deformation ($\epsilon_c$) at a given point of the tire.

The object of the present invention is thus to nullify the shear stresses, at least in the zones in which the tire suffers the greatest deformations. These zones are two in number and are formed by the two shoulders, that is to say the connecting zones between the tread and the sidewalls.

The practical problem therefore consists in introducing some suitable means for equalizing said deformations of the shoulders or at least minimizing them.

The tire in accordance with the present invention, which comprises a tread extended on both sides by a shoulder followed by a sidewall terminating in a bead, which tire consists of elastic material and is at least partially without reinforcement, is characterized by the fact that between each shoulder and the corresponding sidewall the tire contains a zone whose rigidity in circumferential direction is higher than the rigidity of the adjacent shoulder and the adjacent sidewall.

The tire in accordance with the invention can be made either of a single elastic material or of several different elastic materials. In particular, the tread may be formed of different elastic materials superimposed in radial direction.

The expression "at least partially without reinforcement" does not concern the possible presence in the beads of the tire of the invention of a reinforcement, such as a bead ring, which is intended merely to assure the firm seat and possibly the tightness of the beads of the tire on the rim, but rather the presence within the zone of higher circumferential rigidity provided in accordance with the invention of one or more local reinforcements identical to those with which tires having a reinforcement are provided. In other words, there is no reinforcement in the tread and in the two sidewalls of the tire.

Such a zone of higher circumferential rigidity may be provided in any tire of the type under consideration, whatever the profile of its radial section. Thus, the tire may be provided with a local reinforcement formed, for instance, of a ring, a narrow ply of oblique or circumferential wires or cables, a profiled member of material reinforced with oriented or unoriented discontinuous filaments, etc.

Said zone of higher circumferential rigidity may be made of a material different from the material of the adjacent shoulder and the adjacent sidewall. In such case, it is advisable to use a material which is less elastic than the material of both the adjacent shoulder and the adjacent sidewall, provided that it adheres to said adjacent shoulder and adjacent sidewall.

Said zone of higher circumferential rigidity may also be in the form of an annular thickening or bulge which is connected to the adjacent shoulder and to the adjacent sidewall, without interruption of continuity, by its radially outer portion and by its radially inner portion. This annular thickening or bulge can, of course, consist of a material identical to that of the adjacent shoulder and the adjacent sidewall or be comprised mainly of a material different therefrom and/or be provided with an annular strengthener. This thickening or bulge may protrude from both sides or from one side only of the wall of the tire.

However, embodiments which have no protuberances or bulges are preferred, that is to say embodiments wherein the zone of higher circumferential rigidity has the same thickness as that of the adjacent shoulder and the adjacent sidewall and contains an annular strengthener. These embodiments, as a matter of fact, appear to produce at most only slight changes in the distribution of the component of radial deformation ($\epsilon_r$).

The invention will be easily understood from the following description of various embodiments, read with reference to the accompanying drawing, in which:

FIG. 1 is a view of a first embodiment seen in radial section, and

FIGS. 2 to 5 are views of four other embodiments of the invention, which views are similar to FIG. 1 but limited to the portion of the tire involved in the invention.

The tire 1, shown in radial section in FIG. 1, comprises a tread 2 extended on both sides by a sidewall 3, which terminates in a bead 4, intended to be fastened to a rim (not shown). Each bead 4 is reinforced by a bead ring 5.

The upper portion of each sidewall 3 located in the vicinity of the edge of the tread 2 and known as the "shoulder" of the tire forms the zone S in which the shear stresses mentioned above are to be nullified in accordance with the present invention.

In this example, this purpose is achieved by imparting to the zone Z located between the shoulder S and the sidewall 3 a greater thickness in the form of an annular bulge 6 composed of the same elastomer as that of the adjacent sidewall 3 and that of the adjacent shoulder S.

The embodiment shown in FIG. 2 differs from the one shown in FIG. 1 only by the fact that the annular bulge 26 in the zone Z is comprised mainly of an elastomer 28 which is less elastic than that of which the adjacent sidewall 23 and the adjacent shoulder S are formed.

In the embodiment shown in FIG. 3, the annular bulge 36 in the zone Z between the sidewall 33 and the shoulder S contains a ring 38 of a filamentary material, for instance, fibers of a synthetic textile.

The embodiments of FIGS. 4 and 5 differ from the preceding ones essentially by the fact that the zone Z has the same thickness as that of the adjacent shoulder and the adjacent sidewall of the tire. In the case shown in FIG. 4, this zone Z is made more rigid in the circumferential direction than the adjacent sidewall 43 and than the adjacent shoulder S by means of an annular strengthener 48 made of a less elastic material than that of the adjacent sidewall 43 and than that of the adjacent shoulder S.

In the embodiment shown in FIG. 5, the annular strengthener 58 which is located in the zone Z between the sidewall 53 and the shoulder S consists of a ring formed of a steel cable.

As shown in FIGS. 1–5, there is no reinforcement in the treads 2, 22, 32, 42 and 52, respectively, or in the sidewalls 3, 23, 33, 43 and 53, respectively.

What is claimed is:

1. A tire of elastic material having a tread extended on both sides by a shoulder and a sidewall terminating in a bead, said tire being without reinforcement in the tread and in the sidewalls, characterized by the fact that between each shoulder and the corresponding sidewall the tire has a zone whose rigidity in the circumferential direction is higher than the rigidity of the adjacent shoulder and the adjacent sidewall, said zone comprising an annular bulge.

2. The tire according to claim 1, characterized by the fact that the annular bulge is comprised mainly of an elastomer which is less elastic than that of both the adjacent shoulder and the adjacent sidewall.

3. The tire according to claim 1, characterized by the fact that the annular bulge contains a ring of a filamentary material.

4. A tire of elastic material having a tread extended on both sides by a shoulder and a sidewall terminating in a bead, said tire being without reinforcement in the tread and in the sidewalls, characterized by the fact that between each shoulder and the corresponding sidewall the tire has a zone whose rigidity in the circumferential direction is higher than the rigidity of the adjacent shoulder and the adjacent sidewall, said zone having the same thickness as that of the adjacent shoulder and the adjacent sidewall and being comprised mainly of an elastomer which is less elastic than that of both the adjacent shoulder and the adjacent sidewall.

5. A tire of elastic material having a tread extended on both sides by a shoulder and a sidewall terminating in a bead, said tire being without reinforcement in the tread and in the sidewalls, characterized by the fact that between each shoulder and the corresponding sidewall the tire has a zone whose rigidity in the circumferential direction is higher than the rigidity of the adjacent shoulder and the adjacent sidewall, said zone having the same thickness as that of the adjacent shoulder and the adjacent sidewall and containing a ring formed of a steel cable.

* * * * *